(12) United States Patent
Kato

(10) Patent No.: US 10,135,047 B2
(45) Date of Patent: Nov. 20, 2018

(54) BATTERY PACK

(71) Applicant: TOYOTA JIDOSHA KABUSHIKI KAISHA, Toyota-shi, Aichi (JP)

(72) Inventor: Masaki Kato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/176,725

(22) Filed: Jun. 8, 2016

(65) Prior Publication Data
US 2016/0365552 A1 Dec. 15, 2016

(30) Foreign Application Priority Data

Jun. 15, 2015 (JP) ................. 2015-120578

(51) Int. Cl.
*H01M 2/10* (2006.01)
*H01M 10/04* (2006.01)
*H01M 2/02* (2006.01)
*H01M 10/0525* (2010.01)
*H01M 10/0587* (2010.01)

(52) U.S. Cl.
CPC ......... *H01M 2/1077* (2013.01); *H01M 2/027* (2013.01); *H01M 2/1094* (2013.01); *H01M 10/0431* (2013.01); *H01M 10/0525* (2013.01); *H01M 10/0587* (2013.01)

(58) Field of Classification Search
None
See application file for complete search history.

(56) References Cited

U.S. PATENT DOCUMENTS

| 6,051,341 | A | 4/2000 | Terasaki | |
|---|---|---|---|---|
| 8,574,756 | B1* | 11/2013 | Yokoyama | ............ H01M 2/263 429/162 |
| 2012/0308875 | A1 | 12/2012 | Geshi et al. | |
| 2015/0171380 | A1* | 6/2015 | Seong | ................... H01M 2/024 429/179 |

FOREIGN PATENT DOCUMENTS

| CN | 101529641 A | 9/2009 |
|---|---|---|
| JP | H10-199574 A | 7/1998 |
| JP | 2011-054891 A | 3/2011 |
| JP | 2012-104545 A | 5/2012 |
| KR | 2014-0002461 A | 1/2014 |
| WO | 2008/050211 A1 | 5/2008 |

* cited by examiner

*Primary Examiner* — Miriam Stagg
*Assistant Examiner* — Carmen V Lyles-Irving
(74) *Attorney, Agent, or Firm* — Oliff PLC

(57) ABSTRACT

Provided is a battery pack with the heat buildup associated with battery damage can be reduced while increasing the battery capacity. This invention provides a battery pack having an array of power-generating elements comprising rechargeable single batteries. Each single battery comprises a casing and an electrode body in the casing. In the electrode body, the outermost circumference of the negative electrode is outside the outermost circumference of the positive electrode. The power-generating element further comprises a protection plate placed along the outer surface of the single battery. The protection plate has a metal layer and an insulating layer. The metal layer has first and second surfaces on the single battery side and on the side opposite from the first surface, respectively. The insulating layer is placed on the second surface side of the metal layer. The metal layer is electrically connected to the positive electrode with a given positive potential.

10 Claims, 2 Drawing Sheets

[Fig. 1]
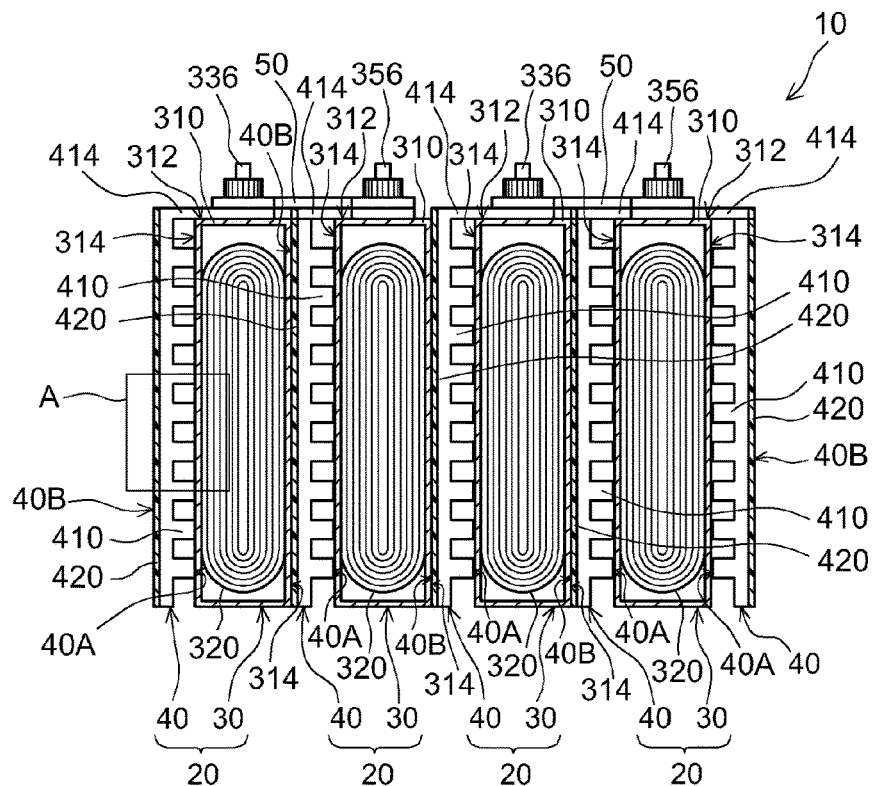
[Fig. 2]
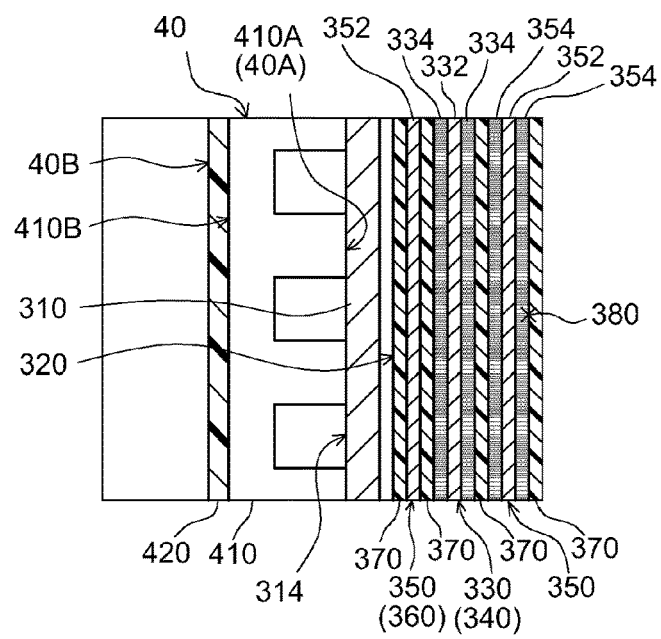

[Fig. 3]
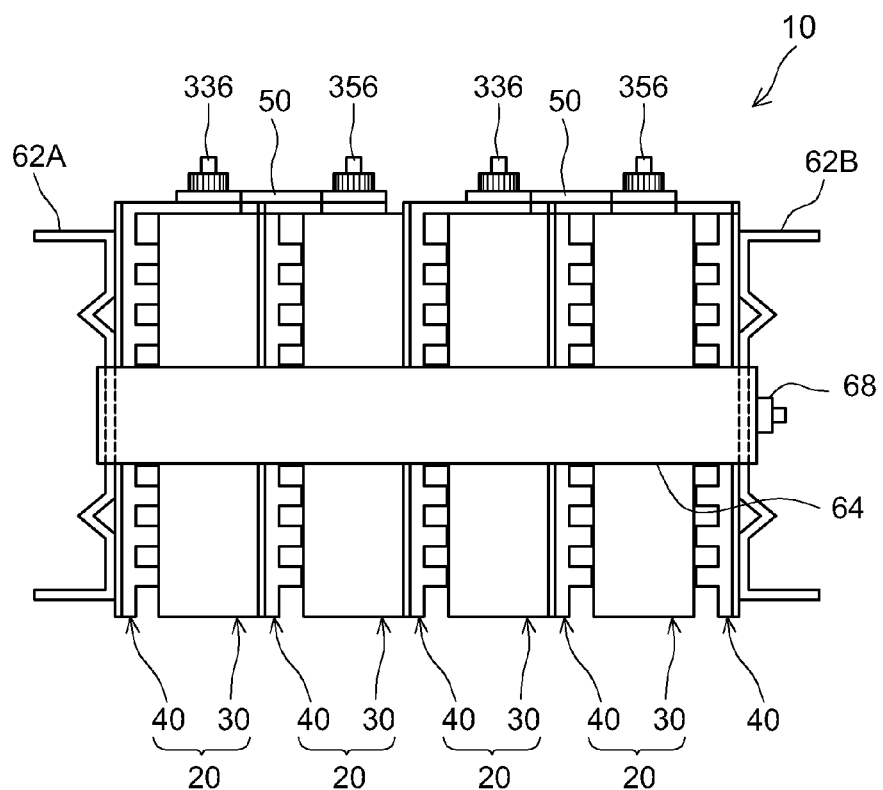
[Fig. 4]
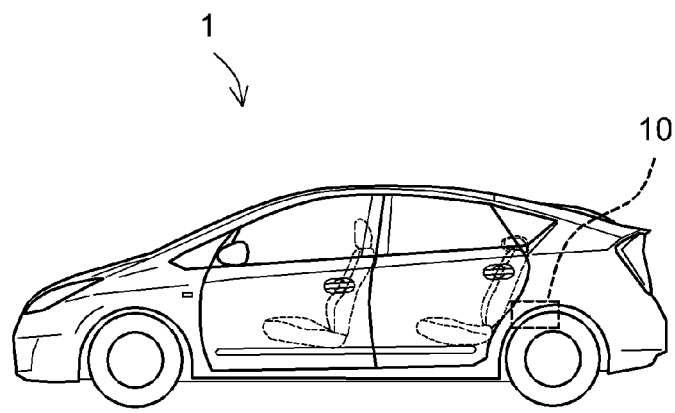

BATTERY PACK

CROSS-REFERENCE

The present application claims priority to Japanese Patent Application No. 2015-120578 filed on Jun. 15, 2015; and the entire contents thereof are incorporated herein by reference.

BACKGROUND OF THE INVENTION

1. Field of the Invention

The present invention relates to a battery pack.

2. Description of the Related Art

Lightweight yet high-energy density lithium-ion secondary batteries, nickel-hydrogen secondary batteries and other secondary batteries are widely used as power supplies for vehicles, PCs, mobile terminals and so on. In particular, battery packs of the secondary batteries serving as single batteries (battery cells) that are connected together are preferably used as high power batteries for vehicles such as electric automobiles and hybrid automobiles. In general, a secondary battery as described above is constructed to have an electrode body in a casing, with the electrode body comprising positive and negative electrodes with a separator placed between the two. Technical literatures related to this type of conventional art include Japanese Patent Application Publication No. 2011-54891. Japanese Patent Application Publication Nos. H10-199574 and 2012-104545 are documents for reduction of internal short circuits in the event of battery damage.

SUMMARY OF THE INVENTION

When a secondary battery such as a lithium-ion secondary battery is pierced with a sharp metal piece in the event of damage such as crushing, via the metal piece stuck in the electrode body inside the battery, etc., a short circuit may occur between the positive and negative electrodes within the electrode body, thereby causing a heat buildup. Proactive measures for such a heat buildup have been suggested, such as a method in which a resistor layer is formed on an electrode current collector surface to suppress the short-circuit current (Japanese Patent Application Publication No. H10-199574) and a method in which a heat-resistant member is placed between the casing and electrode body (Japanese Patent Application Publication No. 2012-104545). As a proactive measure against the heat buildup, it is also effective to give an electrical potential to the casing. For instance, in a secondary battery having a casing with a given positive potential, when a metal piece is stuck in the electrode body, the casing is conducted to the outermost portion of the negative electrode in the electrode body. The conduction to the casing helps prevent concentration of the short-circuit current and overheating inside the electrode body. With this configuration, however, the casing requires a large enough thickness to bear the short-circuit current. For instance, in a secondary battery having a large capacity, a larger short-circuit current occurs. Thus, the casing needs to be thicker in accordance with the large battery capacity. Thus, in a battery pack in which the secondary batteries are arrayed as single batteries, because of the larger thickness of the casing, the capacity loss (impact of the decreased volume energy density) becomes significant.

The present invention is to improve a secondary battery having a casing with a given electrical potential. An objective thereof is to provide a battery pack that comprises multiple single batteries having casings with given electrical potentials, with which the heat buildup in the event of damage to the battery is reduced while the battery capacity can be increased.

To achieve the objective, this invention provides a battery pack in which a plurality of power-generating elements are arrayed, with each element comprising a rechargeable single battery (battery cell). The single battery comprises a casing and an electrode body housed in the casing. The electrode body is a wound electrode body in which a positive electrode sheet, a negative electrode sheet and a separator sheet placed between the positive and negative electrodes are wound together. In the wound electrode body, the outermost circumferential portion (outermost layer) of the negative electrode is outside the outermost circumferential portion (outermost layer) of the positive electrode. The power-generating element further comprises a protection plate placed along the outer surface of the casing of the single battery. The protection plate has a metal layer and an insulating layer. The metal layer has a first surface located on the single battery side and a second surface located opposite from the first surface. The insulating layer is placed on the second surface side of the metal layer. The metal layer is electrically connected to the positive electrode and a positive potential thereby occurs at the metal layer.

With the metal layer provided to the protection plate which is placed outside the single battery and the positive potential occurring at the metal layer, this configuration prevents concentration of short-circuit current in the electrode body in the event of damage to the battery such as sticking of metal by means of conduction between the metal layer and the outermost portion of the negative electrode in the electrode body. This configuration allows for prevention of overheating caused by the short circuit in the event of battery damage without increasing the thickness of the casing. In other words, while preventing overheating in case of battery damage, the casing can be made thinner as compared to conventional configurations and the battery capacity (volume energy density) can be increased for the battery pack. The metal layer, which is superior in thermal conductivity to resin materials, is installed in the protection plate placed adjacent to the single battery. This brings about greater heat dissipation (cooling) in the battery pack, thereby increasing the battery performance as well. The placement of the metal layer also increases the strength of the protection plate. Thus, it also provides greater protection for the single battery against external force, etc. This leads to further thinning. It is noted that since the protection plate can serve as a cooling plate, it can be installed in the battery pack as a substitute for the conventional cooling plate.

In a typical wound electrode body, the positive electrode comprises a positive current collector and a positive electrode active material layer placed on at least one surface of the positive current collector. On the other hand, the negative electrode comprises a negative current collector and a negative electrode active material layer placed on at least one surface of the negative current collector. In a preferable embodiment, on the outermost circumferential portion of the negative electrode, the negative electrode active material layer is not formed at least on the outer circumference-side surface of the negative current collector.

In this description, the "power-generating element" is defined as a unit formed with a single battery (battery cell) and a protection plate placed adjacent to the single battery. The term "single battery" refers to an individual power storage element constituting the battery pack and encompasses batteries of various compositions unless otherwise specified in particular. The single battery disclosed herein is typically a rechargeable battery, that is, a secondary battery; and includes storage batteries such as lithium-ion secondary batteries and nickel-hydrogen secondary batteries. In this description, the "lithium-ion secondary battery" refers to a secondary battery that uses lithium ions (Li ions) as electrolyte ions, and is charged or discharged by transfer of charges associated with Li ions between the positive and negative electrodes. A typical example of the battery pack disclosed herein is a lithium-ion battery module comprising a plurality of such lithium-ion secondary batteries as the single batteries.

In a preferable embodiment of the battery pack disclosed herein, the outer surface of the single battery is provided with a positive terminal electrically connected to the positive electrode and a negative terminal electrically connected to the negative electrode. The metal layer is also connected to the positive terminal and a positive potential thereby occurs at the metal layer. Such a configuration preferably prevents overheating in the event of a short circuit.

In a preferable embodiment of the battery pack disclosed herein, the casing is made of metal and is electrically connected to the positive electrode, giving rise to a positive potential of the casing. The casing is isolated from the outermost circumferential portion of the negative electrode. The positive potential of the casing can effectively prevent overheating in the occurrence of a short circuit. In a more preferable embodiment, the separator extends outside the negative electrode's outermost circumferential portion in the wound electrode body and is located between the casing and the negative electrode's outermost circumferential portion.

This description also provides a battery pack in which a plurality of power-generating elements are arrayed, with each element comprising a rechargeable single battery. The single battery comprises a casing and an electrode body housed in the casing. The electrode body is a wound electrode body in which a positive electrode sheet, a negative electrode sheet and a separator sheet placed between the positive and negative electrodes are wound together. In the wound electrode body, the outermost circumferential portion of the positive electrode is outside the outermost circumferential portion of the negative electrode. The power-generating element further comprises a protection plate placed along the outer surface of the casing of the single battery. The protection plate has a metal layer and an insulating layer. The metal layer has a first surface located on the single battery side and a second surface located opposite from the first surface. The insulating layer is placed on the second surface side of the metal layer. The metal layer is electrically connected to the negative electrode and a negative potential thereby occurs at the metal layer.

According to this configuration, while preventing overheating in case of battery damage, the casing can be made thinner as compared to conventional configurations and the battery capacity (volume energy density) can be increased for the battery pack. The use of the protection plate increases the heat dissipation and protection of the single battery and increases the battery performance as well.

In a typical wound electrode body, the positive electrode comprises a positive current collector and a positive electrode active material layer placed on at least one surface of the positive current collector. On the other hand, the negative electrode comprises a negative current collector and a negative electrode active material layer placed on at least one surface of the negative current collector. In a preferable embodiment, on the outermost circumferential portion of the positive electrode, the positive electrode active material layer is not formed at least on the outer circumference-side surface of the positive current collector.

In a preferable embodiment of the battery pack disclosed herein, the outer surface of the single battery is provided with a positive terminal electrically connected to the positive electrode and a negative terminal electrically connected to the negative electrode. The metal layer is also connected to the negative terminal and a negative potential thereby occurs at the metal layer. Such a configuration preferably prevents overheating in the event of a short circuit.

In a preferable embodiment of the battery pack disclosed herein, the casing is made of metal and is electrically connected to the negative electrode, giving rise to a negative potential of the casing. The casing is isolated from the outermost circumferential portion of the positive electrode. The negative potential of the casing can effectively prevent overheating in the occurrence of a short circuit. In a more preferable embodiment, the separator extends outside the positive electrode's outermost circumferential portion in the wound electrode body and is located between the casing and the positive electrode's outermost circumferential portion.

BRIEF DESCRIPTION OF THE DRAWINGS

FIG. 1 shows a cross-sectional view schematically illustrating the construction inside the single battery and the protection plate in the battery pack according to an embodiment.

FIG. 2 shows a partially enlarged diagram illustrating the region A in FIG. 1.

FIG. 3 shows a schematic side view of the battery pack shown in FIG. 1.

FIG. 4 shows a side view schematically illustrating a vehicle (automobile) comprising the battery pack according to an embodiment.

DETAILED DESCRIPTION OF THE INVENTION

Preferred embodiments of the present invention are described below with reference to the drawings. The dimensional relationship (length, width, thickness, etc.) in each drawing does not represent the actual dimensional relationship. Matters (e.g. the configuration and production method of the electrode, general techniques for constructing the battery, etc.) that are necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

As shown in FIG. 1, a battery pack 10 comprises several power-generating elements 20 comprising single batteries 30 and protection plates 40. In battery pack 10, the several single batteries 30 are arrayed, electrically connected in series. In this embodiment, as single batteries 30, four lithium-ion secondary batteries having the same shape are used. Between every two adjacent single batteries 30, a protection plate 40 is placed, whereby the single batteries 30 are kept at a constant distance. A protection plate 40 is placed also on each side of the series (row) of single batteries 30 arranged in a line (at the outside of the single battery 30 located at each end of the series of single batteries 30).

Each single battery 30 comprises a casing 310 and a wound electrode body 320 housed in casing 310. Casing 310 has a flat square shape (rectangular parallelepiped shape) and has a long, narrow rectangular top face (casing top face) 312 and a side wall (casing side wall) 314 having a broad face. Casing 310 also has a bottom face having basically the same shape as the top face 312 and a side wall having a narrow face. In this embodiment, casing 310 is formed with a box-shaped main casing with a top opening (open top face) and a rectangular lid covering the opening (top face). The opening of the main casing is sealed with the lid after wound electrode body 320 is placed in casing 310. Wound electrode body 320 is placed in casing 310, with the winding axis being laid horizontally. In this description, for convenience of illustration, the face on which the lid is placed is designated as the top face of single battery 30 or the top face of casing 310. However, depending on the orientation of single battery 30, the top face may be at a side or at the bottom. The shape of casing 310 is not limited to the shape of this embodiment. Casing 310 should just have a shape capable of housing wound electrode body 320 and can have, for instance, a cylindrical shape, etc. In casing 310, there may be a member such as an insulating sheet placed between casing 310 and wound electrode body 320.

Casing top face (i.e. lid outer surface) 312 is provided with a positive terminal (external positive terminal) 336 and a negative terminal 356 for external connection and these terminals partially protrude outward on the outer surface side of casing top face 312. While not specifically shown in the drawings, part of positive electrode 336 is electrically connected to positive electrode 330 constituting wound electrode body 320 via the internal positive terminal inside the casing 310. Negative terminal 356 is also electrically connected to negative electrode 350 basically in the same manner as the positive terminal 336.

In this embodiment, a positive potential is given to casing 310. Specifically, casing 310 is conducted to positive electrode 330 by a direct contact with positive terminal 336 at the top face 312 or by a conductive member made of aluminum or the like placed in between with positive terminal 336. The conduction gives rise to the positive potential of casing 310. By this, when damage occurs, casing 310 is conducted to the outermost portion of the negative current collector in the electrode body, thereby preventing overheating inside the battery. Between casing 310 and negative terminal 356 provided to casing top face 312, an insulating member not shown in the drawings is placed. Thus, these two are not conducted.

Casing 310 is formed from a conductive material. In this embodiment, it is made of aluminum. The material of casing 310 can be a metal material such as stainless steel and nickel. In the art disclosed herein, protection plate 40 has a metal layer 410 (as described later in detail) with a given electrical potential; and therefore, it is unnecessary for casing 310 to have an electrical potential. In such a case, casing 310 may be formed from a non-conductive material such as synthetic resin (e.g. polyphenylene sulfide resin, polyimide resin). Every two adjacent single batteries 30 are insulated with an insulating layer 420 described later. Thus, it is unnecessary to cover the outer surface of casing 310 with insulation film, etc.

The thickness (thickness of each wall of) casing 310 can be selected based on the size of single battery 30, etc., and is not limited to a specific range. Usually, the thickness of casing 310 can be selected from a range of about 0.1 mm to 10 mm (e.g. 0.2 mm to 8 mm, typically 0.3 mm to 5 mm). In the art disclosed herein, the short-circuit current flows into the metal layer 410 provided to protection plate 40. Thus, even when casing 310 is made thinner, a large current in the event of short circuit does not cause failure such as melting of casing 310. Thus, the thickness (thickness of at least the casing side wall 314) of casing 310 can be made as thin as about 3 mm or less (e.g. 1 mm or less, typically 0.5 mm or less). This is significant in view of increasing the capacity while decreasing the weight. When single batteries 30 are under confining pressure, with the use of a thin casing 310, the confining pressure can be favorably transmitted to wound electrode body 320.

As shown in FIG. 2, wound electrode body 320 comprises a long sheet of positive electrode 330 and a long sheet of negative electrode 350. Positive electrode 330 comprises a long positive current collector 332 and a positive electrode active material layer 334 placed on at least one face (typically each face) thereof. Negative electrode 350 comprises a long negative current collector 352 and a negative electrode active material layer 354 placed on at least one face (typically each face) thereof. As positive current collector 332, aluminum or an alloy comprising aluminum as the primary component (the most abundant component among all components, typically accounting for more than 50% by weight) is preferably used. Positive electrode active material layer 334 preferably comprises a lithium transition metal compound as the primary component, which comprises lithium and one, two or more species of transition metal. As negative current collector 352, copper or an alloy comprising copper as the primary component is preferably used. Negative electrode active material layer 354 preferably comprises a carbon material such as graphite as the primary component.

Wound electrode body 320 comprises a long sheet of separator 370. In this embodiment, two sheets of separator 370 are placed so that when positive electrode 330 and negative electrode 350 are wound together, each separator sheet is between positive electrode 330 and negative electrode 350. As separator 370, a porous separator formed of a synthetic resin such as a porous polyolefin-based resin is preferably used. Separator 370 may be provided with, for instance, a heat-resistant layer comprising inorganic filler as the primary component.

With reference to FIG. 2, the outermost circumference and its surrounding portion of wound electrode body 320 are further discussed. As shown in FIG. 2, in wound electrode body 320, among positive electrode 330, negative electrode 350 and separator 370, the outermost circumferential portion 340 of positive electrode 330 is located on the innermost side. The outermost circumferential portion 340 of positive electrode 330 comprises positive current collector 332 and positive electrode active material layer 334 placed on each face thereof, in the same manner as the other part of positive electrode 330 (the portion inside the outermost circumference of positive electrode 330 in wound electrode body 320).

The outermost circumferential portion 360 of negative electrode 350 is outside the outermost circumferential portion 340 of positive electrode 330 in wound electrode body 320. Specifically, in the outermost circumferential portion 360 of negative electrode 350, negative current collector 352 is outside the outermost circumferential portion 340 of positive electrode 330 in wound electrode body 320. This allows the short-circuit current to effectively flow into metal layer 410. In this embodiment, the outermost circumferential portion 360 of negative electrode 350 does not have negative electrode active material layer 354 formed on negative current collector 352 unlike in the other part of negative electrode 350 (the portion inside the outermost circumference of negative electrode 350 in wound electrode body 320). The portion inside the outermost circumference of negative electrode 350 comprises negative current collector 352 and negative electrode active material layer 354 formed on each face thereof. The negative electrode active material layer may be present on the outermost circumferential portion of the negative electrode. For instance, the negative electrode active material layer may be provided to the inner circumference-side surface (inner circumferential surface) of the outermost circumferential portion.

The outer circumferential surface (entire lateral surface) of wound electrode body 320 is formed with separator 370. Specifically, in wound electrode body 320, separator 370 placed between positive electrode 330 and negative electrode 350 extends outside the wound electrode body 320 (extends farther from the outer circumferential ends of positive electrode 330 and negative electrode 350), forming the outermost circumference of wound electrode body 320 as a whole. As a result, separator 370 is located between casing 310 and the outermost circumferential portion 360 of negative electrode 350.

Wound electrode body 320 can be fabricated, for instance, as described next. In particular, a laminate body is obtained from the positive electrode 330, negative electrode 350 and separator 370; the laminate body is wound in the length direction to form a wound body; and the wound body is further laterally compressed and flattened out to obtain wound electrode body 320 having a flat external shape. The wound electrode body is not limited to a flat shape. The method for making the flat shape is not particularly limited, either. For instance, the wound electrode body can be fabricated by winding the laminate body into a flat shape.

Casing 310 also contains a non-aqueous electrolyte solution 380. Thus, single battery 30 can be referred to as a non-aqueous electrolyte battery as well. In particular, non-aqueous electrolyte solution 380 is impregnated in wound electrode body 320. Generally, non-aqueous electrolyte batteries have high energy densities and are combustible. It is particularly significant to provide heat buildup-reducing properties according to the art disclosed herein to battery pack 10 comprising such a non-aqueous electrolyte battery as single battery 30. Non-aqueous electrolyte solution 380 may comprise about 0.5 mol/L to 3 mol/L of a supporting salt (e.g. $LiPF_6$) in a non-aqueous solvent such as a carbonate (e.g. ethylene carbonate, diethyl carbonate, ethyl methyl carbonate, etc.).

Single battery 30 has a battery capacity (or a theoretical capacity) of usually suitably 5 Ah or greater (e.g. 10 Ah or greater, typically 20 Ah or greater) and it is set at 35 Ah in this embodiment. A larger battery capacity tends to lead to an increased heat buildup. Thus, the heat buildup-reducing properties according to the art disclosed herein is more effectively obtained with respect to battery pack 10 comprising single batteries 30 having a battery capacity of 25 Ah or greater (e.g. 30 Ah or greater, typically 35 Ah or greater, but 100 Ah or less).

Protection plate 40 has a plate shape and is placed along the outer surface (in particular, casing side wall 314) of casing 310 of single battery 30. Protection plate 40 has a first surface 40A as the single battery 30-side surface and a second surface 40B located opposite from the first surface 40A. In this embodiment, the first surface 40A of protection plate 40 faces the casing side wall 314 of single battery 30 and is in contact therewith. Protection plate 40 has a layered structure including metal layer 410 and insulating layer 420, with the metal layer 410 being placed along the outer surface of single battery 30. This placement brings about excellent protection and heat-dissipating properties. Protection plate 40 placed between two adjacent single batteries 30 favorably insulate the single batteries 30 from each other with the insulating layer 420.

In this embodiment, the first surface 40A of protection plate 40 is constituted with metal layer 410. The second surface 40B of protection plate 40 is constituted with insulating layer 420. The first surface 410A of metal layer 410 faces the outer surface (in particular, the casing side wall 314) of single battery 30 and is in contact therewith. The second surface 410B (the surface located opposite from the first surface 410A of metal layer 410) is flat and insulating layer 420 is placed on the second surface 410B side.

The first surface 40A of protection plate 40 has an uneven structure formed with alternating ridges and grooves. In particular, in side view of protection plate 40 (in the configuration shown in FIGS. 1 and 2), several grooves are formed in the first surface 40A of protection plate 40 to form a comb shape. These grooves are lined in a row from one end through the other end in the first surface 40A of protection plate 40. By incorporating a cooling medium (typically air) in the grooves (in particular in the voids formed between the grooves of protection plate 40 and the casing side wall 314 of single battery 30), the heat generated in single battery 30 can be efficiently radiated. In other words, the grooves serve as cooling medium channels and protection plate 40 serves as a cooling plate (heat-dissipating member) having the cooling medium channels. Especially in this embodiment, protection plate 40 exhibits excellent heat-dissipating properties because the highly heat-conductive metal layer 410 is placed on the first surface 40A side of protection plate 40 and the grooves are formed in the surface of metal layer 410. The dimensions of the uneven structure, such as the depth, width and interval of the grooves, can be suitably selected in accordance with the capacity of single battery 30, strength of protection plate 40 and so on. The second surface 40B of protection plate 40 is flat.

Metal layer 410 is connected to positive terminal 336 provided to single battery 30 that faces the first surface 40A of protection plate 40 and thereby electrically connected to positive electrode 330 to have a positive potential. In particular, metal layer 410 has a plate-shaped connecting member 414 at an upper part of the region along the casing side wall 314 of single battery 30. The connecting member 414 extends continuously from a part of the upper end of the region along the casing side wall 314 of single battery 30 and bends to further extend along the casing top face 312 of single battery 30 to reach positive terminal 336. Connecting member 414 has a through hole not shown in the drawings. The protruding portion of positive terminal 336 is inserted in the through hole and fixed with a fixing means such as a screw to allow conduction between metal layer 410 and positive terminal 336. The metal layer 410 is not connected to the positive terminals 336 of the other power-generating elements 20.

Metal layer 410 is formed from a conductive material. In this embodiment, it is made of aluminum. As for the material of metal layer 410, in addition to aluminum, other metals such as stainless steel and nickel as well as an alloy comprising these as the primary components can be used. To give a positive potential to metal layer 410, metal layer 410 is preferably formed of aluminum or an alloy comprising aluminum as the primary component. To give a negative potential to the metal layer, as the material of the metal layer, stainless steel, nickel or an alloy comprising these as primary components can be used.

The thickness of metal layer 410 can be selected in accordance with the sizes of battery pack 10 and single battery 30, the battery capacity, etc., and thus is not limited to a specific range. From the standpoint of the durability, heat dissipation, strength and so on in the event of a short circuit, metal layer 410 according to a preferable embodiment has a thickness of 1 mm or larger (e.g. 3 mm or larger, typically 4 mm or larger). Metal layer 410 having such a thickness can be preferably used in battery pack 10 in an embodiment where confining pressure is applied in the row direction of single batteries 30. The thickness of metal layer 410 can be about 20 mm or less (e.g. 10 mm or less, typically 5 mm or less). From the standpoint of the durability, heat dissipation, strength and so on in the event of a short circuit, the thickness ratio of metal layer 410 to protection plate 40 is suitably higher than 50%, or preferably 70% or higher (e.g. 80% or higher, typically 85% or higher). From the standpoint of ensuring insulation with insulating layer 420, the thickness ratio is suitably about 99% or lower (e.g. 97% or lower, typically 95% or lower). When grooves are formed in a surface of metal layer 410, the thickness of metal layer 410 refers to the thickness from the top of a groove in the surface through the opposite surface.

The short-circuit current can generally increase with increasing battery capacity. Thus, the dimensions (thickness here) of metal layer 410 that takes up the short-circuit current can be selected in accordance with the battery capacity. From such a standpoint, in a power-generating element 20, the thickness of metal layer 410 per unit battery capacity (1 Ah) of single battery 30 is preferably 0.10 mm/Ah or greater (more specifically, 0.11 mm/Ah or greater, or even more specifically 0.114 mm/Ah or greater). Thus, for instance, in a power-generating element 20 that comprises a single battery 30 having a battery capacity of 8.75 Ah or higher, the thickness of metal layer 410 in protection plate 40 is preferably 0.875 mm or greater (more specifically 0.962 mm or greater, or even more specifically 0.997 mm or greater). In a power-generating element 20 that comprises a single battery 30 having a battery capacity of 35 Ah or higher, the thickness of metal layer 410 is preferably 3.5 mm or greater (more specifically 3.85 mm or greater, or even more specifically 3.99 mm or greater).

As in this embodiment, when both metal layer 410 and casing 310 have positive potentials, in addition to the thickness of metal layer 410, the thickness of casing 310 can also be used to reduce heat buildup in the event of a short circuit. Especially, greater effects can be obtained when metal layer 410 and casing 310 are in direct contact (at least partially in surface contact). From such a standpoint, the combined thickness of casing 310 (typically casing side wall 314) and metal layer 410 in contact with the casing 310 is preferably 1 mm or greater (e.g. 3 mm or greater, typically 4 mm or greater). The combined thickness of casing 310 (typically casing side wall 314) and metal layer 410 is suitably about 30 mm or less (e.g. 15 mm or less, typically 5 mm or less).

Insulating layer 420 is placed on the second surface 410B side of metal layer 410. Placed between metal layer 410 and another power-generating element 20, it serves to insulate these two. In this embodiment, insulating layer 420 is formed almost entirely over the second surface 410B of metal layer 410. The material of insulating layer 420 is typically an insulating material such as resin (preferably synthetic resin). The type of resin is not particularly limited. Various resin materials can be used, such as polyolefins including polypropylene, polyesters including polyethylene terephthalate, fluorinated resins including polytetrafluoroethylene, polyamides and phenolic resins. A highly heat-resistant resin material (especially a phenolic resin) is preferable.

The insulating layer 420 should have a thickness that can ensure insulation. It is suitably in a range of about 0.01 mm to 10 mm (e.g. 0.05 mm to 5 mm). The mechanical strength and heat dissipation of protection plate 40 can be provided by metal layer 410. Thus, the insulating layer 420 according to a preferable embodiment has a thickness of about 1 mm or less (e.g. 0.5 mm or less, typically 0.3 mm or less). It can also have a thickness of, for instance, about 0.2 mm or less (or even 0.1 mm or less).

The thickness of protection plate 40 is selected depending on the sizes of battery pack 10 and single battery 30, battery capacity and so on. Thus, it is not particularly limited to a specific range. It is suitably in a range of about 1 mm to 30 mm (e.g. 2 mm to 20 mm, typically 3 mm to 10 mm). Protection plate 40 may provide great heat dissipation and strength as it has the metal layer 410 as described above. Accordingly, it can be made thinner than conventional resin cooling plates. Protection plate 40 may thus have a thickness of 7 mm or less (e.g. 5 mm or less). For purposes such as increasing the tightness of adhesion between metal layer 410 and insulating layer 420, it may have an additional layer such as a bonding layer.

In battery pack 10, the plurality of single batteries 30 are arranged so that they are alternately inverted with alternating positive terminals 336 and negative terminals 356. Between two adjacent single batteries 30, the positive terminal 336 of one is electrically connected via a conductive connecting member 50 to the negative terminal 356 of the other. By connecting the respective single batteries 30 in series in such a manner, battery pack 10 can be constructed. The two adjacent single batteries 30 are arranged so that the casing side wall 314 of one faces the casing side wall 314 of the other with a protection plate 40 placed between the two. This arrangement is repeated in accordance with the number of single batteries 30 in battery pack 10. To be specific, the casing side wall 314 that faces the other single battery 30 is the broad face of casing 310, which also corresponds to the flat face of wound electrode body 320 placed in the casing 310.

Single batteries 30 and protection plates 40 arrayed as described above are confined in a state where a load is applied in the row direction. As shown in FIG. 3, single batteries 30 and protection plates 40 lined in the row direction are surrounded with a confining member that holds the several single batteries 30 and protection plates 40 altogether. Specifically, on the farther outside of the outermost single batteries 30 across the row, with in-between protection plates 40, a pair of confining plates 62A and 62B are placed. A tightening beam 64 is attached so as to bridge the pair of confining plates 62A and 62B. The edges of beam 64 are tightened and fastened with a screw 68 to confining plates 62A and 62B so that single batteries 30 and protection plates 40 are confined with a certain load applied in the row direction. The battery pack may comprise an additional member such as a sheet member as a means to adjust the length, etc.

Battery pack 10 should just comprise a plurality (two or more, e.g. three or more, or even four or more) of power-generating elements 20. In this embodiment, battery pack 10 has four units of the power-generating element 20 as shown in the drawing. The capacity advantage by the art disclosed herein can be effectively obtained in battery pack 10 comprising a greater number of power-generating elements 20. Accordingly, the number of power-generating elements 20 in battery pack 10 is preferably 5 or more (e.g. 6 to 12, typically 8 to 10) or more preferably 10 or more (e.g. 20 or more, typically 50 to 60). Such battery pack 10 may comprise an array of several assemblies of about 4 to 10 power-generating elements 20.

In battery pack 10, the heat buildup is reduced in the event of a short circuit while the battery capacity (volume energy density) is increased. These advantages can be exhibited particularly preferably when used in a vehicle that has a large battery capacity and an array of a relatively large number of single batteries 30. Thus, battery pack 10 disclosed herein can be preferably used as a power supply particularly for motors (electric motors) installed in vehicles such as automobiles. As shown in FIG. 4, this description provides a vehicle 1 (typically an automobile, especially an automobile comprising an electric motor such as a hybrid automobile, electric automobile and fuel cell automobile) comprising battery pack 10 as the power source.

In the embodiment above, a positive potential is given to metal layer 410 of protection plate 40. The art disclosed herein is, however, not limited to this and a negative potential may also be given to the metal layer. In this case, it is preferable to fabricate the wound electrode body so that the outermost circumferential portion of the positive electrode is outside the outermost circumferential portion of the negative electrode in the wound electrode body. Such a configuration can also bring about basically the same effects as the embodiment described above. In a preferable embodiment, the casing can be given with a negative potential instead of a positive potential.

EXAMPLES

Verification tests related to the present invention are discussed next. As test batteries, power-generating elements 1 to 5 (battery capacity: 35 Ah) having square lithium-ion secondary batteries and protection plates (cooling plates) were constructed. Power-generating elements 2 to 5 have basically the same configuration as the power-generating element according to the embodiment described above (a configuration as shown in FIGS. 1 and 2); and the thicknesses of the casings and metal layers are as shown in Table 1. Power-generating element 1 has a conventional configuration without a metal layer and a 6.0 mm thick resin plate is used as the cooling plate corresponding to the protection plate. Otherwise, it has the same configuration as power-generating elements 2 to 5.

[Needle Penetration Test]

Each power-generating element obtained was subjected to a prescribed conditioning treatment. Subsequently, the voltage across the positive and negative electrodes was adjusted to 4.2 V. At a temperature of 25° C., the power-generating element comprising the conditioned single battery was pierced through with a needle to force the single battery to have a short circuit. Specifically, a needle of 3 mm diameter was forced to penetrate from the protection plate side completely through the central area of the casing side wall at a rate of 10 mm/min. The state (temperature change) of the single battery during this was observed. When the temperature rise (the highest temperature reached) of the single battery was at or below a preset temperature (test reference temperature), it was graded "P" for pass. When the temperature continuously increased above the preset temperature, it was graded "F" for fail. The results are shown in Table 1.

TABLE 1

| Power-generating element | 1 | 2 | 3 | 4 | 5 |
|---|---|---|---|---|---|
| Thickness of casing (mm) | 0.4 | 0.4 | 0.4 | 0.4 | 0.4 |
| Thickness of metal layer (mm) | — | 1.0 | 2.5 | 4.0 | 6.5 |
| Results of needle penetration test | F | F | F | P | P |

[Discharge Resistance]

The power-generating element 1 (conventional configuration) and power-generating element 4 were charged to 100% SOC at a temperature of 25° C. Each power-generating element adjusted to 100% SOC was discharged at 200 A and the voltage drop was measured for the 10 seconds. The voltage drop value (V) measured was divided by the corresponding current value to determine IV resistance. The average value was recorded as the discharge resistance. According to the results, in power-generating element 4, the discharge resistance decreased by 20% as compared with power-generating element 1.

From the results of the needle penetration test, a tendency is found that the temperature rise of the single battery decreases with increasing thickness of the metal layer constituting the protection plate. As shown in Table 1, with the battery capacity of 35 Ah, by the use of the protection plate comprising a metal layer of at least 4 mm thickness, the temperature rise of the single battery was reduced to or below the prescribed level, exhibiting sufficient heat buildup-reducing properties. According to the studies by the present inventor, because the thickness of the metal layer is proportional to the battery capacity, for instance, when the battery capacity is 8.75 Ah, it is thought desirable to use a metal layer of at least 1 mm thickness. In power-generating element 4 having a metal layer, the battery performance increased (typically as a decrease in resistance) relative to the metal layer-free power-generating element 1. This may be because the metal layer provided to the protection plate increased the heat dissipation and contributed to increase the battery performance. Furthermore, with the metal layer provided to the protection plate, the power-generating element can be sized down without sacrificing the heat buildup reduction, strength, etc., in the event of a short circuit. From the results of the specific studies, it has been found that a power-generating element comprising a square battery of 35 Ah battery capacity can be sized down by 9.9 mm (width) per unit. This means that, for instance, with respect to a battery pack comprising 56 units of the power-generating element, it can be downsized by 555 mm based on the row length. It also means a capacity gain of +47 Ah for the whole battery pack as compared with the conventional configuration.

Although specific embodiments of the present invention have been described in detail above, these are merely for illustrations and do not limit the scope of claims. The art disclosed herein includes various modifications and changes made to the specific embodiments illustrated above.

REFERENCE SIGNS LIST 1 vehicle
10 battery pack
20 power-generating element
30 single battery
40 protection plate
40A first surface (single battery-side surface) of protection plate 40B second surface (opposite from the single battery side) of protection plate
310 casing
312 top face of casing
314 side wall of casing
320 wound electrode body
330 positive electrode
332 positive current collector
334 positive electrode active material layer
336 positive terminal
340 outermost circumferential portion of positive electrode
350 negative electrode
352 negative current collector
354 negative electrode active material layer
356 negative terminal
360 outermost circumferential portion of negative electrode
370 separator
410 metal layer
410A first surface (single batter-side surface) of metal layer
410B second surface (opposite from the single battery side) of metal layer
414 connecting member
420 insulating layer

What is claimed is:

1. A battery pack comprising:
a plurality of power-generating elements arrayed in the battery pack, with each element comprising a rechargeable single battery, wherein
the single battery comprises a casing and an electrode body housed in the casing,
the electrode body is a wound electrode body in which a positive electrode sheet, a negative electrode sheet and a separator sheet placed between the positive and negative electrodes are wound together,
in the wound electrode body, the outermost circumferential portion of the negative electrode is outside the outermost circumferential portion of the positive electrode,
the power-generating element further comprises a protection plate placed along the outer surface of the casing of the single battery,
the protection plate has a metal layer and an insulating layer,
the metal layer has a first surface located on the single battery side and a second surface located opposite from the first surface,
the insulating layer is placed on the second surface side of the metal layer,
the metal layer is electrically connected to the positive electrode and the metal layer is thereby given with a positive potential,
the casing has a rectangular parallelepiped shape,
the protection plate is placed on both sides of each single battery in the plurality of power generating elements in a direction in which the plurality of power generating elements are arranged,
the insulating layer insulates the metal layer and an adjacent single battery, and the insulating layer of the protection plate abuts the casing of the adjacent single battery.

2. The battery pack according to claim 1, wherein
the single battery has an outer surface provided with a positive terminal electrically connected to the positive electrode and a negative terminal electrically connected to the negative electrode, and
the metal layer is connected to the positive terminal and the metal layer is thereby given with a positive potential.

3. The battery pack according to claim 1, wherein
the casing is made of metal and is electrically connected to the positive electrode, thereby giving a positive potential to the casing, and
the casing is isolated from the outermost circumferential portion of the negative electrode.

4. A battery pack comprising:
a plurality of power-generating elements arrayed in the battery pack, with each element comprising a rechargeable single battery, wherein
the single battery comprises a casing and an electrode body housed in the casing,
the electrode body is a wound electrode body in which a positive electrode sheet, a negative electrode sheet and a separator sheet placed between the positive and negative electrodes are wound together,
in the wound electrode body, the outermost circumferential portion of the positive electrode is outside the outermost circumferential portion of the negative electrode,
the power-generating element further comprises a protection plate placed along the outer surface of the casing of the single battery,
the protection plate has a metal layer and an insulating layer,
the metal layer has a first surface located on the single battery side and a second surface located opposite from the first surface,
the insulating layer is placed on the second surface side of the metal layer,
the metal layer is electrically connected to the negative electrode and the metal layer is thereby given with a negative potential,
the casing has a rectangular parallelepiped shape,
the protection plate is placed on both sides of each single battery in the plurality of power generating elements in a direction in which the plurality of power generating elements are arranged,
the insulating layer insulates the metal layer and an adjacent single battery, and
the insulating layer of the protection plate abuts the casing of the adjacent single battery.

5. The battery pack according to claim 4, wherein
the single battery has an outer surface provided with a positive terminal electrically connected to the positive electrode and a negative terminal electrically connected to the negative electrode, and
the metal layer is connected to the negative terminal and the metal layer is thereby given with a negative potential.

6. The battery pack according to claim 4, wherein
the casing is made of metal and is electrically connected to the negative electrode, thereby giving a negative potential to the casing, and
the casing is isolated from the outermost circumferential portion of the positive electrode.

7. The battery pack according to claim 1, wherein
a ratio of the thickness of the metal layer to the thickness of the protection plate is greater than 50% and less than or equal to 99%.

8. The battery pack according to claim 4, wherein
a ratio of the thickness of the metal layer to the thickness of the protection plate is greater than 50% and less than or equal to 99%.

9. The battery pack according to claim 1, wherein the casing does not have an electrical potential.

10. The battery pack according to claim 4, wherein the casing does not have an electrical potential.

* * * * *